United States Patent
Giberson et al.

(10) Patent No.: US 7,059,551 B2
(45) Date of Patent: Jun. 13, 2006

(54) FLUID COUPLING FOR MOBILE EQUIPMENT

(76) Inventors: Melbourne F. Giberson, 30 Ludwig's Crossing La., Glenmoore, PA (US) 19343; Mark T. Simonelli, 930 Kings Arms Dr., Downington, PA (US) 19335; Frederick C. Wiesinger, Jr., 1550 Allentown Rd., Lansdale, PA (US) 19446; Gerald L. Abrams, 3232 W. Mount Kirk Ave., Eagleville, PA (US) 19403

( * ) Notice: Subject to any disclaimer, the term of this patent is extended or adjusted under 35 U.S.C. 154(b) by 159 days.

(21) Appl. No.: 10/782,342

(22) Filed: Feb. 19, 2004

(65) Prior Publication Data

US 2004/0211847 A1  Oct. 28, 2004

Related U.S. Application Data

(62) Division of application No. 10/171,125, filed on Jun. 13, 2002, now Pat. No. 6,769,248.

(51) Int. Cl.
*B02C 25/00* (2006.01)

(52) U.S. Cl. ........................... 241/34; 241/101.2

(58) Field of Classification Search .............. 60/338, 60/352, 358; 241/101.2, 34, 35
See application file for complete search history.

(56) References Cited

U.S. PATENT DOCUMENTS 2,697,556 A * 12/1954 Turner .................... 241/35
5,472,146 A   12/1995 Doppstadt

* cited by examiner

*Primary Examiner*—Mark Rosenbaum
(74) *Attorney, Agent, or Firm*—Polster, Lieder, Woodruff & Lucchesi L.C.

(57) ABSTRACT

In an assembly including a diesel engine, a fluid coupling connected to the flywheel of the diesel engine, a comminuting machine and a conveyor for feeding the comminuting machine, a fluid coupling module is common to various output power train assemblies. Slip speed of the fluid coupling between impeller input and runner output shafts is measured, and modulates or regulates the process feed rate of the conveyer. An electrically actuated control valve acts as an oil flow diverter valve directing oil into the fluid coupling impeller when a signal to engage the coupling is given, and in response to a signal from an over-temperature sensor when the temperature of circuit oil leaving the element exceeds a preset set point value, diverts the oil to a reservoir, thereby permitting the impeller and runner cavity to evacuate, which separates the engine from the load.

1 Claim, 7 Drawing Sheets

FLUID COUPLING FOR MOBILE EQUIPMENT

CROSS REFERENCE TO RELATED APPLICATION

This is a division of application Ser. No. 10/171,125 entitled Fluid Coupling for Mobile Equipment, which was filed on Jun. 13, 2002 now U.S. Pat No. 6,769,248 and which is incorporated herein by reference.

STATEMENT REGARDING FEDERALLY SPONSORED RESEARCH OR DEVELOPMENT

Not Applicable.

BACKGROUND OF THE INVENTION

This invention has to do with a fluid coupling for use on diesel engine-driven mobile equipment such as wood chippers, rock crushers, road surface grinders (also known as scarifiers or road millers), and the like comminuting mills. This comminuting mill equipment is typically used in conjunction with feedstock conveyors, or in the case of the road surface grinder, used in conjunction with a method to move the grinder along the road to be ground. For controlling the speed and connecting and disconnecting the mills and engines, there are four types of clutch in common use. Three types can be engaged and disengaged with the engine running: a mechanical clutch, a hydraulically operated mechanical clutch, and a fluid coupling. One type must be engaged with the driver stopped and it is usually disengaged with the driver running: a mechanical torque limiter. The feedstock conveyors, or driving mechanisms of road grinders, are typically driven separately by hydraulic motors via hydraulic pumps that are mounted on and powered by the diesel engine, the conveyors being controlled by a manual control valve remotely operated by the operator of the mobile equipment. Heretofore, with a mechanical clutch, the conveyors have been run at a constant speed that may be set by the operator or at a speed that is directly proportional to engine speed. Because the hydraulic pumps and motors are positive displacement; if a jam develops in the mill, the operator operates the control valve to the reverse position, the feedstock conveyor stops and backs up for several seconds at the same speed as it goes forward, and then when the operator observes that the mill is cleared, the operator manually puts the valve into forward position and the conveyor returns to a normal forward feeding rate. A problem with this combination of a mechanical clutch and a manually operated conveyor or road grinder is that the operator's reaction time is slow, compounded because the operator has much equipment to operate simultaneously, and therefore, it is relatively easy to jam a mill to a complete stop. If such a quick and immediate stop occurs, the diesel engine, especially certain susceptible components, such as turbochargers, can be expected to be damaged, often requiring repairs before restart.

These problems of damage to the diesel engine and its susceptible components are generally tolerable when the diesel engines being used are only up to 300 hp. However, the problems that result from a quick and immediate stop are exacerbated as the diesel engine sizes increase to the current levels of 1000 to 1500 HP and as the new electronically controlled fuel systems are introduced that measurably increase the power ratings of diesel engines without significantly changing the physical size and without significantly changing the physical strength of the engines.

Mechanical clutches have been widely used in such diesel engine driven mobile equipment applications. A mechanical clutch mechanism, such as manufactured and supplied by Twin Disc, Inc. of Racine, Wis., is mounted onto the flywheel housing of a diesel engine. In such a manually operated mechanical clutch, a lever is used to operate the clutch pack and requires an operator to be next to the diesel engine and clutch housing while engaging and disengaging the clutch. This arrangement functions reasonably well except when a very hard object or a large amount of feedstock is fed into the comminuting mill, for example, a hammer mill, and the hammer mill becomes overloaded and jams. In this case, the belts driving the hammer mill slip and wear, the bearings become overloaded, and the diesel engine stops almost instantaneously. This damages the bearings, the belts, the clutch, the diesel engine, and the turbocharger for the diesel engine.

As a mechanical clutch is used over time, the surfaces of the clutch plates wear and the linkage needs to be adjusted to make certain the clutch can be fully disengaged at one end of the clutch lever throw and fully engaged at the other end of the clutch lever throw. If the clutch cannot be fully disengaged, then a considerable amount of power can still be transmitted and the clutch plates will get very hot and possibly become severely damaged. If the clutch cannot be fully engaged, then the clutch will slip at high-power conditions and wear rapidly. Because lever activated mechanical clutches require the operator to be situated very close to the diesel engine, clutch, sheave and belts or other load equipment when the lever is actuated to engage and/or to disengage the load equipment, if the high-powered mechanical equipment breaks, parts may be thrown about and pose grave risk to the operator. Hydraulically operated mechanical clutches that use a lever operated master hydraulic cylinder and a slave hydraulic cylinder to operate the clutch permit the operator to be further removed, but the rest of the problems remain.

Another version of an hydraulically actuated mechanical clutch is one wherein the mechanical clutch pack is compressed and thereby engaged by means of hydraulic pressure, and the hydraulic pressure is controlled by an electronic controller, such as manufactured by Power Transmission Technology, Inc., of Ohio. In normal operation, the electronic controller, which is remote from the clutch, can be manually given a signal to engage, and the controller causes hydraulic pressure to act, engaging the clutch. Similarly, a manual signal to the controller can cause the hydraulic pressure to be released, and the clutch pack is released and almost no power is transmitted through the clutch. Under abnormal conditions such as a jam that develops over several seconds, the electronic controller, essentially a dedicated digital computer based controller, can sense a decrease in speed, and the controller can release the clutch pack and attempt to reengage the clutch a series of times. After a preset number of attempts to reengage the mill wherein the speed of the output shaft of the clutch does not increase to engine speed, the electronic controller will decide that the mill is jammed, and the controller can cause the clutch pack to remain released. In summary, this type of electronically controlled, hydraulically actuated mechanical clutch (a) in the case of a jam that develops over several seconds, can separate the engine from the mill when the mill is jammed, saving the engine and its susceptible components from damage, but, in the case of an instantaneous jam, cannot separate the engine from the mill fast enough to avoid stopping the engine and damaging susceptible components, and (b) can sense when there is too much wear of the clutch parts to assure full engagement, and can separate the engine from the mill in this case, or once separated, can maintain separation of the engine from the mill. However, this type of hydraulically actuated mechanical clutch suffers from the problem of all mechanical clutches: From time to time and depending upon operator care and the types of duty to which the mill is subjected, the transmission must be disassembled and the worn clutch plates must be replaced.

For lower power equipment, below perhaps 300 hp, mechanical clutches do not wear much during normal engagement and normal disengagement. However, as the power transmitted increases to the current levels of 1000 to 1500 hp, the wear of mechanical clutches during normal engagement and normal disengagement increases to the point that it is noticeable and is a concern. Due to the wear during normal engagement and normal disengagement, and due to the possibility of shearing shafts and couplings during a quick engagement event and throwing these parts about, it is common practice for manufacturers of all sizes of mechanical clutches to provide signs to be mounted on the equipment and visible to the operators, that the clutches must be engaged when the engine is operating at idle speed, and not above idle speed, and particularly, not at the normal running speed which is well above idle speed.

In recent years, mechanical torque limiters have been introduced and used to separate the engine from the mill in the case of a jam in the mill. A mechanical torque limiter is a mechanical device that can be mounted on the end of the output shaft of the mechanical clutch in direct drive arrangements. They can also be used with side load applications, and they function as described here. In a mechanical torque limiter, a housing part mounted on the driving shaft contains a series of radial or axial pins backed by springs and the mating part, a driven part, is attached to the driven shaft; this driven part having detents into which the ends of the pins are seated. The housing part and the driven part are held concentric to each other by rolling element bearings. When an over torque condition occurs, the pins slide up from the bottom of the deep-end groove and the springs overload and functionally break away, causing the two parts of the mechanical torque limiter to separate mechanically so that torque can no longer be transmitted from one part to the other part. For safety, the springs and pins of the mechanical torque limiter are retained in the housing part. After the driver is stopped, the springs and pins of the mechanical torque limiter can be manually reset. After the hammer mill is cleared, the diesel engine can be started and the equipment put back into service. The pins, detents, and rolling element bearings do experience some wear during each separation event, and therefore, they can be expected to require reconditioning maintenance from time to time, with the frequency in proportion to the severity of the duty.

Fluid drives for stationary equipment have been in service for several years, with the earliest ones being developed in approximately 1905. Three well-known manufacturers of this equipment today are Turbo Research, Inc (of the USA), Voith (of Germany) and Transfluid (of Italy). Three broad categories are (1) variable speed fluid drives, (2) constant speed fluid couplings that, after the start-up period on the order of seconds, have no means for any significant variance of the output speed which is slightly less than the speed of the driver, and (3) fluid couplings for which the output speed is either nearly zero or slightly less than the speed of the driver, and can be repeatedly cycled between these two states by operation of an oil flow control valve which controls the flow of circuit oil, respectively, by either bypassing oil to the reservoir in the "off" state or by directing oil to the fluid coupling in the "on" state. Such a control valve may also be referred to as a diverter valve.

Variable speed fluid drives of type (1) above are described in U.S. Pat. Nos. 5,331,811, 5,315,825, and 5,303,801, and are manufactured by Turbo Research, Inc. and Voith. These patents are referenced to provide extensive background on fluid drive technology, since variable speed drives are not the subject of the present discussion.

Fluid couplings for stationary equipment identified as type (2) above have been in service for several years, particularly on stationary motor driven equipment, such as mills and conveyors. Two well-known manufacturers of this type are Voith (of Germany), and Transfluid (of Italy), represented by Kraft in the USA.

One of the most common forms of type (2) fluid couplings is self-contained, and has all of the circuit oil stored in it. One part of the fluid coupling, the impeller and impeller casing assembly, which forms the entire outer shell, is mounted on an end of a motor shaft. The driven portion, including a runner, is mounted onto the shaft of the driven equipment such that the runner is inside the impeller and impeller casing assembly. These fluid couplings, which are almost invariably designed and manufactured with the impellers, runners, and casings made from aluminum for reasons which include lower weight and lower cost, have a series of fuse plugs mounted in the outer periphery. These fluid couplings are intended to be used for "soft-start" conditions, and are not expected to be used where jams are to be encountered, though occasionally jams are encountered. Often this type of fluid coupling has two functional chamber for containing oil, one chamber containing most of the oil when the fluid coupling is stopped, and a second chamber which is the fluid coupling chamber that contains the impeller and runner vaned structures used for transmitting torque from the impeller to the runner. Once the motor is started, oil moves from the storage chamber to fill the fluid coupling chamber containing the impeller and runner with oil and the oil can not be removed from the fluid coupling chamber without (a) either shutting down the motor or (b) opening (melting) the fuse plugs. When this type of fluid coupling is stopped under normal circumstances, the oil drains from the fluid coupling chamber back to the storage chamber. When in operation, heat is generated in the fluid coupling in proportion to the slip speed between the input shaft speed and the output shaft speed, and the slip speed increases in direct proportion to the torque transmitted. In normal operation, the cooling fins that are cast into the outer surface of the impeller and casing dissipate to the surrounding air the heat generated by the fluid slip process. Should the equipment become overloaded, or the load equipment jam, much heat will be generated in the oil and in order to protect the load equipment as well as to protect the aluminum parts of the fluid coupling from failing, the fuse plugs will melt, permitting the oil to be spewed out of the rotating impeller casing until empty, and this separates the load equipment from the motor, and the motor will operate essentially unloaded until it is shut down. Several gallons of very hot oil typically are spilled in such an event. This is dangerous for personnel in the area, can be a fire hazard, and, today, depending upon the amount of oil spilled in such an event occurring in the United States, it may well be a reportable event to the United States Environmental Protection Agency (EPA). Due to these safety and environmental issues, Turbo Research, Inc. has not manufactured this type of equipment.

A subsequent version of this equipment by Voith, and Transfluid for use with mobile equipment included a sealed external housing around the rotating element and oil circulating pumping and cooling equipment. The fluid coupling impellers, runners, and casings are still made from cast aluminum with the vanes being thin, and the impellers or impeller casings contain the fuse plugs so that during an overload event the fuse plugs melt, the oil spews out of the rotating element limiting the temperature to which the aluminum parts are exposed and the duration of the exposure, but the oil is contained in the sealed external housing and is not lost. The diesel engine can be stopped under a controlled stop sequence without damage. However, in order to be able to run again, the external housings of this design have to be opened and the fuse plugs have to be replaced. The fuse metal is contained somewhere in the oil reservoir, and unless the reservoir is completely cleaned out, the fuse metal can be drawn into the oil pump with the normal suction oil flow, and therefore, potentially, the fuse metal can pose problems to the oil circulating pump.

Fluid couplings of type (3) above are the primary focus of this document. Turbo Research, Inc., Voith and Transfluid have developed fluid couplings which can be turned on and off by changing the state of an oil flow control diverter valve, usually an electrically operated valve such as an electric motor operated valve or an electrical solenoid operated diverter valve. Some of the Voith and Transfluid fluid couplings use fuse plugs in the outer periphery of their fluid couplings and these fuse plugs melt during an over-temperature event, and must be replaced by opening the external housing, or at least by opening a port in the external housing. Turbo Research, Inc. fluid coupling design uses an over-temperature switch to continuously monitor the circuit oil temperature as it discharges through a series of orifice holes at the periphery of the impeller or impeller casing, and in response to an over-temperature condition, this over-temperature switch causes an electrically operated diverter valve to divert circuit oil from going to the fluid coupling element and to bypass the circuit oil flow stream to an oil reservoir. After such an over-temperature event occurs, the fluid coupling chamber evacuates, and the diesel engine can be caused to idle, which gives the various elements of the fluid coupling a period of time in which to cool gradually, avoiding excessively high thermally induced stresses, particularly in the components of the rotating element. Voith and Transfluid also incorporate the function of an over-temperature switch to monitor the circuit oil as it discharges from the circuit, though there may well be a different method of effecting this function, and such switch causes an electrically operated diverter valve to change state as described above upon sensing an over-temperature condition. With a fluid coupling in operation instead of a mechanical clutch, as the mill becomes overloaded, the output speed of the fluid coupling and the speed of the mill decrease substantially and in direct ratio to each other, while the diesel engine speed either remains constant or declines to a limited degree, but the diesel engine does not stop. In the case of a fluid coupling and a manually controlled feedstock conveyor, as above described, the reaction time of the operator is still slow, and therefore, it is still easy to jam a mill to a complete stop. However, with a fluid coupling with a circuit oil discharge temperature sensing device in service, if the circuit oil discharge temperature does increase above the pre-set trip point as occurs when the mill, the output shaft and attached runner stop, and the diesel engine and attached impeller will continue to rotate, while the fluid coupling system shuts down with no damage to the engine or to its components.

Turbo Research, Inc. developed fluid couplings with heavy duty steel impellers, runners, and casings so that these fluid couplings can be engaged and disengaged at any engine speed, including full engine operating speed, and can survive undamaged more severe over-temperature events than can be expected from fluid couplings made with cast aluminum components, particularly those having cast aluminum components with thin vanes. Experience with the Turbo Research, Inc. fluid couplings indicates that if the mill was not cleared and therefore is still jammed at the time that the fluid coupling is engaged, the circuit oil will get hot, the over-temperature switch will detect this and will trip the circuit oil control valve so that the circuit oil is diverted, and the fluid coupling returns to the disconnected state, with no damage to the fluid coupling or to the drive train.

Today many fluid couplings are designed with some means for continuously monitoring the circuit oil as it discharges from the element, with over-temperature switches, and with electrically controlled circuit oil flow diverter valves, and have no wearing parts such as the mechanical clutches have, have no resetable springs and detents such as the mechanical torque limiters have, and have no fuse plugs such as were previously used in the Voith and Transfluid fluid couplings. For this reason, it has been shown that the fluid couplings with the over-temperature switches and oil diverter valves are the lowest maintenance clutch means available.

One advantage of the fluid coupling over a mechanical torque limiter is that occasionally there are lumps in the feed stock entering the hammer mill that are big enough to cause a mechanical torque limiter to separate, even when set to separate at five times rated torque, but which can be chewed up and processed with a fluid coupling because the fluid coupling continues to transmit power in a substantially overloaded condition for some period of time. During the time period of this overload condition, the temperature of the circuit oil and of the fluid coupling continue to increase, but in that time period, hard lumps, if not too large or not too many, will be processed and the comminuting mill will clear itself. If the mill does not clear itself by the time that the circuit oil discharge temperature reaches the trip set-point, the over-temperature switch causes the circuit oil to be diverted to a reservoir, and the impeller-runner cavities will empty, thus reducing the torque transmission of the fluid coupling to a minimum, so that the diesel engine becomes unloaded and can be shut down in a normal shutdown method without damage, so that in this manner, the fluid coupling functions as a torque limiting device.

In some cases, the mobile equipment drive train can be assembled with a fluid coupling driven by an engine, the fluid coupling driving a mechanical torque limiter, the mechanical torque limiter in turn driving the mill, for the specific purpose of having the fluid coupling benefit of being able to chew through overload conditions as well as for having the mechanical torque limiter benefit of minimizing damage to the mill should a large chunk of steel enter the mill and be hit by a hammer causing a great impact sufficient to separate the parts of the mechanical torque limiter immediately thereby instantaneously terminating the power to drive the mill.

Voith and Transfluid typically manufacture the external stationary housings for their type (3) fluid couplings either as complete castings or welded fabrications including the oil reservoir, and they use a bearing arrangement with a bearing between the housing and the input end of the input shaft, two shaft bearings between the input and output shaft assemblies to resist side loading, and one bearing between the housing and the output shaft, so that one output shaft can be used for dual purposes: (a) mounting a flexible coupling hub for direct drive, or (b) mounting an overhung sheave with side loaded belts that does not require and does not permit a support bearing on the outboard end of the sheave. The Voith and Transfluid design with a bearing supporting the input end of the input shaft requires some form of radial flexibility between the input shaft of the fluid coupling and the flywheel of the diesel engine because there are substantial radial runouts in the nominal design of diesel engines, and consequently, this design uses a form of a Holset coupling with elastomeric elements between the coupling part fixedly mounted to the flywheel and the coupling part fixedly mounted to the input shaft.

Turbo Research, Inc. developed a fluid coupling module that can be used with, and bolted to, any of several output power train assemblies such as, for example, clamshell with sheave and outboard bearing for side loads, direct drive housing with outboard bearing, parallel offset gears and gear housing, and right angle gears and gear housing, wherein each fluid coupling module and output drive train assembly use the appropriate output shaft for the fluid coupling runner and the specific drive train selected. Further, the Turbo Research, Inc. fluid couplings are designed with a bearing arrangement having two high capacity bearings supporting the output shaft and, in the case of the side load drive train, straddling the sheave or gear, and the inboard end of the output shaft, which is overhung into the fluid element cavity, supports one inter-shaft bearing to one end of the input rotating assembly. In this design, the input end of the input shaft, impeller and impeller casing assembly is supported by a series of thin flexible diaphragms that, near the outer periphery, are fixedly bolted to the diesel engine flywheel, and near the inner edges, are fixedly bolted to the input shaft, providing axial and angular bending flexibility between the input shaft of the fluid coupling and the diesel engine crankshaft and flywheel assembly, and therefore, in this arrangement, the bearings of the diesel crankshaft functionally support the input end of the fluid coupling input shaft and impeller assembly. The advantages of this design include (a) the ability of the large straddle bearings of the output shaft to handle repeatedly extremely large side loads concomitant with a jam of a mill, (b) a very substantial reduction in overall length provided by the use of a flexible diaphragm disc coupling instead of a Holset style coupling between the flywheel and the fluid coupling input shaft, which is beneficial to those applications where the axis of the engine and fluid coupling drive train is transverse the mobile equipment trailer, and therefore, perpendicular to the length of the drive train, and (c), due to (b), a reduction in the overall trailer width, reducing or eliminating the need for special permits for the trailer to travel on the highways.

The diaphragm discs used in the subject fluid couplings are adapted from diesel engine driven electric generators made by Onan of Minn., in which application the diesel engine crankshaft and crankshaft bearings support through the flywheel and disc-pack the inboard end of an electric generator. Individual discs are on the order of 0.040 to 0.060 inches thick, and multiple discs are used in a disc pack, the number of discs depending upon the torque transmitted. The discs are made by a stamping process using accurate dies, and are commercially available. Such disc packs are radially stiff, have limited flexibility in relative axial displacement between the connected shafts, and are quite flexible in angular bending between the connected shafts. Similar disc packs are used in a variety of flexible couplings connecting two adjacent shaft ends, are available in many sizes, are sold under the trade name of Thomas, are made by Rexnord, and are also commercially available. The application of a flexible disc-pack to a fluid coupling driven by a diesel engine as done herein has, to our knowledge, not been done before.

In the assemblies of a mobile equipment trailer having certain combinations of equipment that include fluid couplings, allocations of space may be such that it is beneficial to have the reservoir located remotely from, yet at a level below, the bottom flange of the fluid coupling. This can be accommodated with the use of a conduit of sufficient diameter between the bottom flange of the fluid coupling and the reservoir, and with a pump directly driven by an electric motor or a hydraulic motor. Preferably, the inlet to the pump is below the oil level of the reservoir. The pump may be located in the reservoir or separate from the reservoir.

SUMMARY OF THE INVENTION

In accordance with this invention, generally stated, a fluid coupling module is provided that incorporates an input (impeller) section and its means for connection to a prime mover, a fluid coupling section, an oil pumping and oil conditioning system, including a reservoir and an included pump located vertically below the fluid coupling sections, and remotely mounted controls and control logic. This fluid coupling module is then common to output power train assemblies taken from the group consisting of a clam-shell housing, sheave and straddle bearings for side load; a straight-through drive housing and outboard bearing for direct drive; a parallel offset gear and housing assembly; and a right angle gear and housing assembly, whereby the same fluid coupling module can be employed by any of the output power train housing assemblies using an appropriate output shaft for the fluid coupling runner and output power train assembly selected.

In the preferred embodiment, flexible diaphragm plates are fastened near their outer periphery to the fly wheel of a diesel engine, and near their radially inner edges to an outer end of an input shaft to the impeller of the fluid coupling, whereby the input shaft is supported at its outer end by the flexible diaphragm plates and crank shaft bearings of the diesel engine.

Also, in an assembly including a prime mover (generally a diesel engine) for driving a fluid coupling, a rotating comminuting machine such as a hammer mill, an output power train between the fluid coupling and the comminuting machine, and a conveyor for feeding material into the comminuting machine, the fluid coupling having an impeller and a runner, means are provided for measuring the slip speed between the impeller and the runner, and for regulating the speed of the conveyor or, for example, for regulating the speed of movement of the road grinder, in response to the slip speed relative to the set point slip speed. Preferably, the slip speed differential is calculated as a percent, whereby the regulation is substantially independent of the running speed of the prime mover. The means for regulating the speed of the conveyor, for example, can include a multi-toothed wheel and a mating speed pickup, mounted on the output shaft of the fluid coupling, a signal from the engine speed detector such as is used by the engine speed governor, and an electronic controller with suitable programming, whereby the electronic controller modulates the speed of the feed stock conveyor in order to maintain the slip speed of the fluid coupling at a preset set point value, for example 2.5% or 3%, with the preset set point value being selected to optimize the production according to certain objectives desirable to the operator, such as chip size, type of material being processed, tons processed per gallon of diesel fuel, or simply, tons processed per operating hour. An advantage of using the slip speed to control the conveyor speed arises from the development of new engines and controls. In older diesel engines, the governors, which controlled fuel flow to maintain a pre-set engine speed, were primarily mechanical in nature, and permitted some droop in the speed of the engine in response to an increase in the load. In this situation, the conveyor can use the droop of the engine speed as an indicator of load. In newer engines, the governors or fuel flow controllers, are very precise and can maintain a given speed with almost no droop in actual engine speed over the entire load range until the full fuel flow condition is reached, and for further increases in load, the speed droops dramatically. For this type of governor, engine speed is almost of no value to control the conveyor speed because there is no speed change until overload condition occurs, which is what is trying to be avoided. Then, an overload of feed stock is what causes the engine to go into overload condition and the speed to droop, but the overload has already occurred and could not be detected until after the fact. With a fluid coupling, the slip speed is directly related to torque transmitted in a linear relationship: if there is no torque transmitted, there is no slip. As the load increases, the slip increases, so with the slip speed as the measure, it is now easy to determine the degree of loading of the power train and the approach to an overload condition can be detected before it occurs, even though the engine speed remains constant or almost constant over the entire load range up to the point of overload. Hence, for either the mechanically controlled governors or the newer electronically controlled governors, the slip speed of the fluid coupling provides a better indicator of load and a better indicator of approach to an overload condition than was heretofore available with either type of governor. Alternatively, because the speed of the output shaft is a function of the slip speed, in that the greater the differential in speed between the input and output shafts, the greater the slip speed differential, a multitoothed wheel mounted on said output shaft and a mating speed pickup can be used to control the speed of the conveyor, whereby the speed of the conveyor is a function of the speed of the output shaft. An electrical or electronic speed determining device can be used instead of the multitoothed wheel.

In the variable speed method of the present invention for controlling the feed stock conveyor, the feed stock conveyor can at times be driven substantially faster than the present common fixed conveyor speed, because most of the time the mill is under-loaded, so that speeding up the conveyor when it is under-loaded and the slip speed is below the set point slip speed will send up more feed stock into the hammer mill in a given period of time. Then when the hammer mill is heavily loaded so that the actual slip speed, for example, 3.7%, is larger than the set point slip speed, say 2.5%, then the controller slows down the conveyor. Control programs using PID (proportional, integral and differential) are readily available and are well known by control designers today. Another reason for using slip speed is that the engine speed is variable and can be set anywhere in the range of 1800 to 2300 rpm, for example, depending upon several variables, including the type of material available, its condition, and the size of the chip desired to be made. In any case, modulating the rate of feed into the mill in order to maintain a given slip ratio will optimize the tons milled per hour and the tons milled per gallon of diesel fuel used, and will keep engine load in normal operating range for a greater portion of the operating time, thereby minimizing air pollution due to abnormal fuel/air ratios.

Input and output shafts of the fluid coupling are oriented substantially horizontally. A removable reservoir, located vertically below the level of impeller and runner casings and input and output shafts, contains a circulating oil pump within the reservoir, positioned with an intake submerged in circulating oil, so as to be self priming. The circulating oil includes both circuit oil, which fills impeller and runner cavities, and lubricating oil for the bearings. A heat exchanger for the circulating oil is provided with a vent line at its top communicating with the oil reservoir to ensure that the heat exchanger does not become air locked. A temperature control valve is provided to mix cooled oil from the heat exchanger with hot oil that bypasses the heat exchanger to provide oil at a preset temperature to the fluid coupling. A filter is provided to assure that no significant particulate matter enters the bearings. A heating element is provided in the oil reservoir to warm the oil prior to starting the fluid coupling and the diesel in cold weather conditions. An electrically actuated control valve is provided as an oil flow diverter valve that directs circuit oil into the fluid coupling element when the signal to engage the coupling is given, and an over-temperature sensor is provided such that when the temperature of the circuit oil leaving the element exceeds a preset set point value, as occurs when the mill jams, the sensor sends a signal to the controller and on to the diverter valve to divert the circuit oil to the reservoir, thereby permitting the impeller and runner cavity to evacuate, which separates the engine from the load, and the engine can then be brought to idle and cooled down and shut down in a normal manner without damage to any part of the entire power train, and in so doing permit the entire train to be brought back into service after the mill is cleared. The operation of the diverter valve does not affect the operation of the bearing oil lubrication system, which continues as long as the impeller casing is rotating.

By making the fluid coupling a part of a module that includes the fluid coupling housing, the reservoir and its pump, the diverter valve, heat exchanger, temperature control valve, filter, piping, and controls including a programmable controller for the feedstock feeding process, and by providing for bolting to the output shaft end of the housing various forms of power train, including the clam-shell housing with belt sheave, the module can be supplied to a manufacturer as a unit, for use with whatever type of power train is required.

BRIEF DESCRIPTION OF THE SEVERAL VIEWS OF THE DRAWINGS

Referring now to the drawings for illustrative embodiments of this invention.

DETAILED DESCRIPTION OF INVENTION

Figure 3:
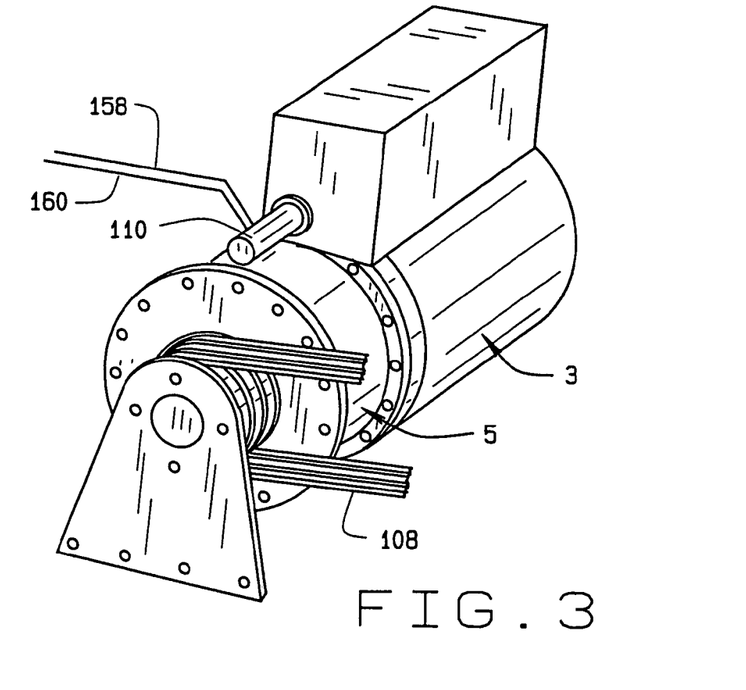
FIG. 3 is a somewhat diagrammatic view in perspective of a diesel engine, showing a hydraulic pump and a module of this invention without a clamshell housing and with an external bearing support, merely to illustrate the tending of belts from a sheave shown in FIG. 1.
Figure 4:
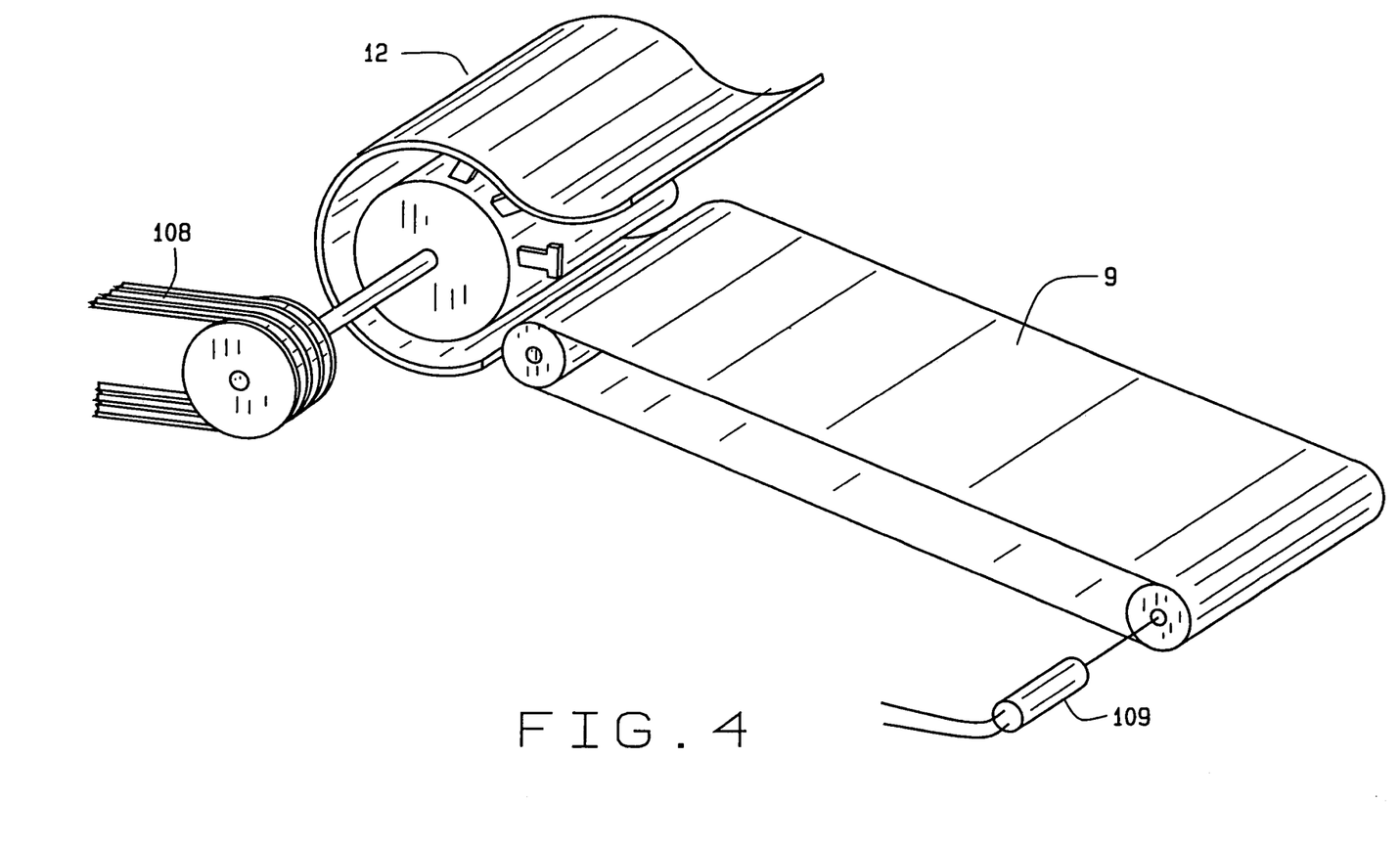
FIG. 4 is a diagrammatic view in perspective, partly expanded, of a hammer mill and feed conveyor and its hydraulic motor.
Figure 7:
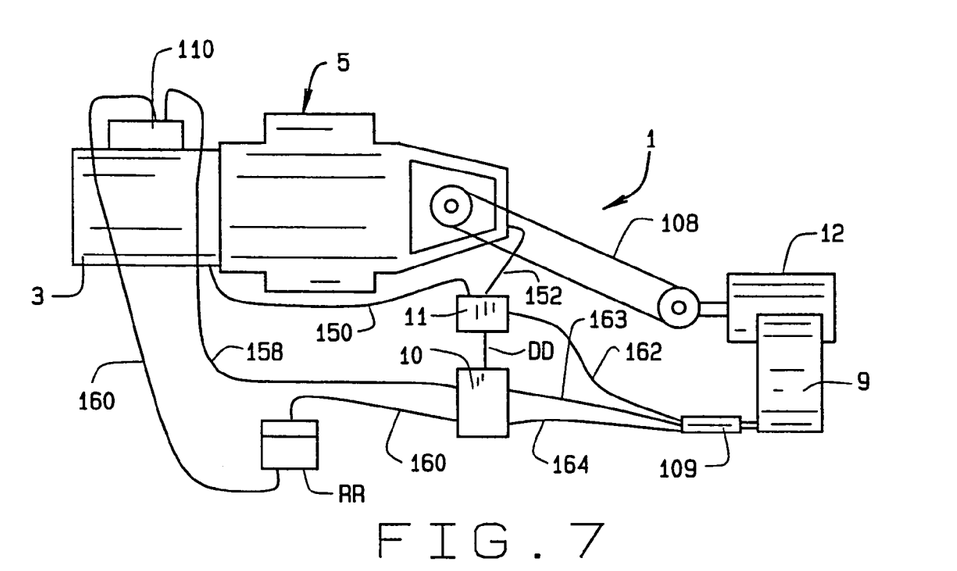
FIG. 7 is a schematic view of an entire assembly of this embodiment of the invention.

Referring now to the drawings, particularly FIGS. 3, 4, and 7, reference numeral 1 indicates an entire assembly, including a diesel engine 3 with a hydraulic pump 110 with hydraulic lines 158 and 160 with a hydraulic oil reservoir RR, a fluid coupling 5, a conveyor 9 with hydraulic motor 109 with hydraulic lines 163 and 164, accompanying hydraulic controls 10 driven through a communication channel DD by programmable electronic controls 11 with electronic input signal lines 150, 152, and 162, and a hammer mill 12 with driving belts 108.

Figure 1:
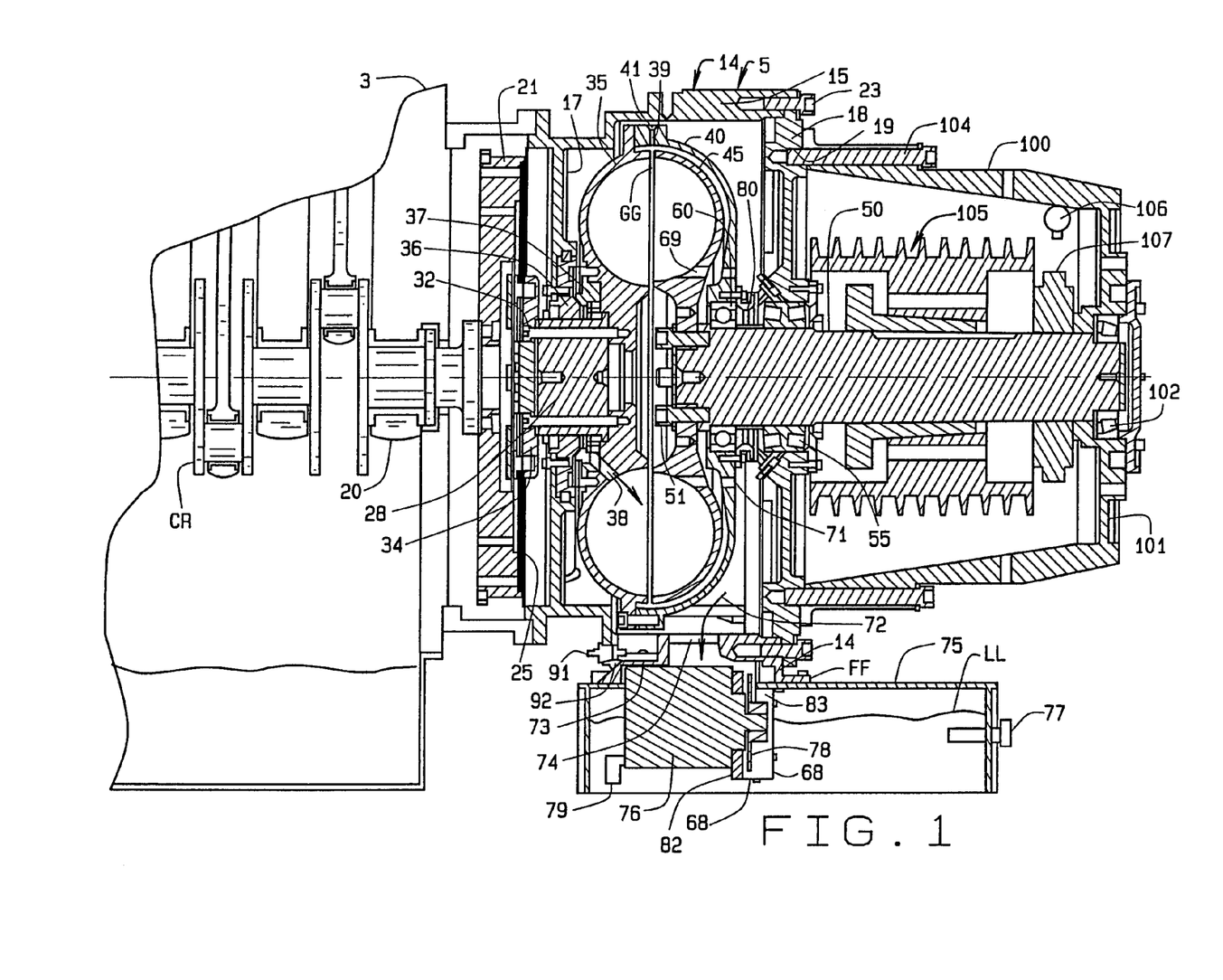
FIG. 1 is a fragmentary view in side elevation, partly in longitudinal section and partly broken away of a portion of one embodiment of the assembly of this invention.
Figure 2:
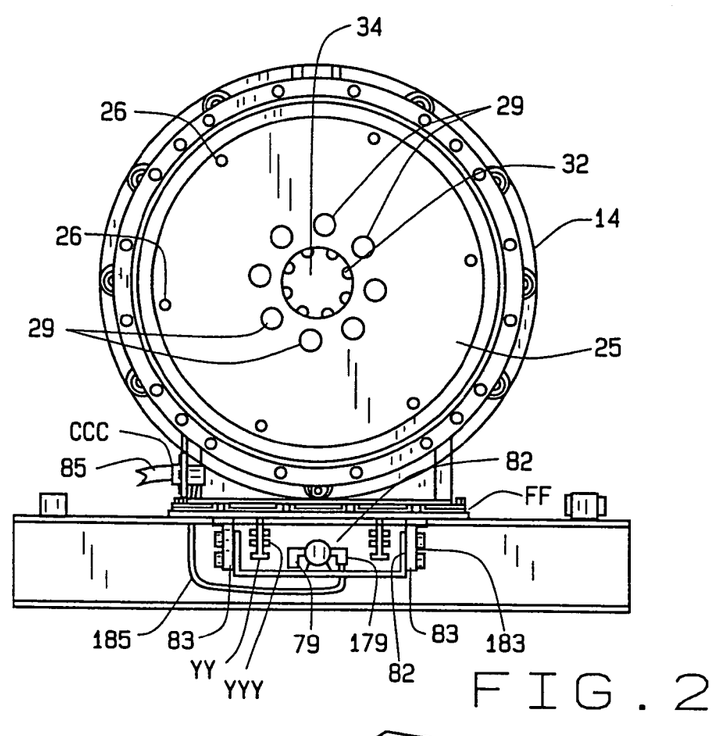
FIG. 2 is a view in elevation of the input end of a module shown in section in FIG. 1.

As is shown in FIG. 1, the fluid coupling 5 has a housing 14, with a generally cylindrical outer wall 15 and a flanged area FF at its bottom to which a reservoir 75 is mounted. At an impeller end of the housing, is an inner wall 17. At a runner end, a heavy wall or center housing plate 18 is bolted to the housing outer wall 15. The plate 18 has a circle of interiorly threaded bolt-receiving bosses 19 opening outwardly.

The diesel engine 3 has a crankshaft CR, crankshaft bearing 20 and flywheel 21. In the illustrative embodiment shown, diaphragm flex plates 25 are bolted through holes in a circle near the outer edge of the plates with bolt and washer assemblies 26 to the flywheel 21, and, through a circle of holes near an inner edge of the plates with bolt and washer assemblies 29, into a hub 34. Long bolts 32 pass through hub 34, through an impeller shaft 28, and into a boss of an impeller 35. Between the inner wall 17, and the impeller 35, a circuit oil nozzle 36, attached to inner wall 17, is adapted to supply circuit oil to an impeller oil pump 37, attached to a back side of the impeller 35, and communicating through passages 38 with the interior of the impeller. An arrow on FIG. 1 delineates the flow path of circuit oil from the external supply pipe (not here shown), through passages in the inner wall 17, through the nozzle 36, into and through the impeller oil pump 37, through passages 38, and into the impeller 35.

The impeller 35 has vanes integral with its interior surface. The impeller is bolted to an impeller casing 40, which surrounds a runner 45. In this embodiment, the mating surface between the impeller casing and the impeller is offset in a direction toward the input end from the plane of the gap between the impeller casing and the impeller, as shown in FIG. 1. This reduces the stresses in the faces of the vanes of the impeller induced by the centrifugal forces of the oil in the impeller casing, hence, on the impeller, when the circuit is full of oil, the objective being to reduce the possibility of cracking of the vanes. The impeller casing 40 is supported by a bearing 60 mounted on an output shaft 50. The output shaft 50 is bolted to a runner 45 with bolts 51, in this embodiment. The output shaft 50 is supported by a spherical roller radial bearing 55 mounted in an opening in the center housing plate 18. Radial passages 39 in the periphery of the impeller casing 40 have a replaceable orifice plug or fitting 41 to permit a predetermined amount of oil from the impeller and runner cavities to pass through the orifice 41 and into housing 14, wherein, in this embodiment, the flow divides, the larger portion flowing through port 74 at the bottom of the housing into the reservoir 75, and a smaller portion flowing into a trough 92, into which a temperature sensor 91 extends, through a small port 73 in the trough 92, into the reservoir 75. The size of the orifice plug 41 selected may be increased to increase the rate at which the cavities evacuate after the control valve is turned to bypass, but must be small enough to assure that a portion of the circuit oil overflows through axial passages 71 in the impeller casing 40 to provide a full circuit of oil in normal operation. The oil overflowing through passages 71 joins the bulk of the oil flowing from orifices 41 through port 74 into reservoir 75. Axial passages 69 extend from the interior of the runner to the chamber between the runner 45 and the impeller casing 40, near the innermost end of the runner cavity. The primary purpose of the passages 69 is to provide venting of the interior chambers of the impeller and runner in order for air and oil vapor as well as oil to pass freely to avoid vapor locking the inner cavities. For the oil flowing out of the passages 71, the principal flow path is through a gap GG between the face of the runner at its periphery and the opposed face of the impeller, through the gap between the inner surface of the impeller casing 40 and the outer surface of the runner 45, and exiting through passages 71 into the housing 14. Additionally, any oil passing from the runner cavity through passage 69 can also exit through passages 71 into the housing 14. Oil in the housing 14 from both the axial passages 71 and the orifice passages 39 is substantially a foam, that is, a mixture of oil and air, and it partially detrains as it drains along path 72 through an opening 74 in the bottom of the housing 14, into the reservoir 75 fixedly attached to the flange FF which is an integral part of the outer wall housing 14. The level of oil LL in the reservoir is set as close to the top of the tank as possible consistent with oil draining back from the heat exchanger and other equipment without overflowing when the engine is stopped. The oil level drops when the fluid drive is in service, because the oil fills all of the stationary equipment and the rotating fluid coupling element. An objective in sizing the reservoir is to have a volume of oil contained in the reservoir that is typically equivalent to the flow of oil pumped in 45 to 60 seconds, because this residency time normally is adequate to detrain sufficiently the oil for fluid coupling service.

A circulating oil pump 76 is positioned within the reservoir with an inlet 79 that is below the level of oil LL in the reservoir so as to make the pump self priming. In most fluid coupling service, positive displacement pumps are used because they can handle oil that contains foam, that is, oil that contains a portion of air, generally up to 10% and sometimes up to 15% air. The air in the oil is compressed in the oil as it passes through the pump, thereby maintaining the same mass flow rate of the oil, but decreasing the volumetric flow rate in proportion to the air contained in the oil at atmospheric, or suction, pressure. Air can also exit (or enter) the oil in the impeller and runner cavities, depending upon the degree of turbulence, and exit (or enter) through passages 69 and 71, as required. In this embodiment, the pump 76 is mounted on a slidable plate 82, which can slide vertically in slots in the interior surfaces of a pair of symmetric support brackets 83 that are fixedly mounted to flange FF by bolts. The pump is chain driven by means of a drive sprocket 80 attached to the impeller casing 40, a driven pump sprocket 78 that is mounted on the pump drive shaft and aligned axially to the drive sprocket 80, and a chain, not shown, that runs between the drive sprocket 80 and the pump sprocket 78. In the embodiment shown, a spaced "L" shaped wall 68 made of thin metal is attached to the ends of the symmetric slotted support brackets 83 so that the lower end of the wall almost contacts, or does contact, the sliding plate 82 at a distance below the reach of the pump sprocket 78, so as to form a pump sprocket well, isolating the pump sprocket from the bulk of the oil in the reservoir to reduce agitation of the oil by the action of the chain and pump sprocket. An internal oil supply line comprising a flexible hose 185 is connected to a pump discharge port 179 at one end and at another end to a fitting CCC. The entire movable pump assembly comprising pump 76, slidable plate 82, and sprocket 78, are moved to provide proper tension to the chain, and locked in place by tightening bolts 183. Vertical jack bolts YY and lock nuts YYY can be used to aid in adjusting the tension of the chain. In the embodiment shown here, oil reservoir 75 is mounted to flange FF of the housing 14. After the pump is mounted, hoses are attached, the chain is tensioned, and the sprocket well plate is attached. In an alternate embodiment, suitable access ports in the top of the reservoir can be used to allow the manipulation of the pump assembly and the loosening and tightening of the bolts holding the sliding plate, as well as connecting one end of a flexible hose to the pump discharge port 179 and the other end to a fitting, similar in function to CCC, for passing oil to the outside of the fluid coupling, which fitting may be mounted on any surface of the reservoir as suits the application.

A heater and thermostat 77 in the reservoir conditions the circuit oil in the reservoir when the ambient temperature is too low.

Figure 5:
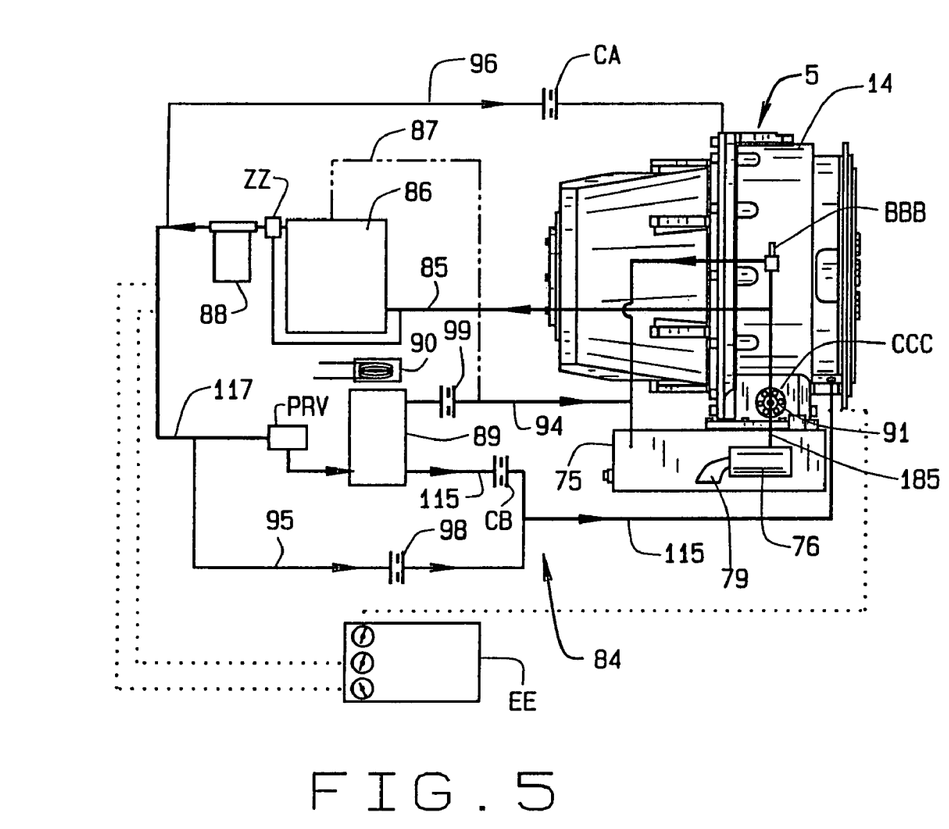
FIG. 5 is a diagrammatic view of an oil system applied to a module of this invention shown in side elevation.

Referring now to FIG. 5, an oil system 84 includes an internal oil supply line 185 from the pump 76 to a fitting CCC, an external oil supply line 85, a pressure relief valve BBB with a return line to the reservoir 75, a heat exchanger 86 which has a vent line 87 at its uppermost point to vent trapped air to the reservoir 75, a temperature control valve Z, a filter 88, an oil header 117, a back pressure regulating valve PRV, an oil flow diverter valve 89, operated by an electrical actuator 90, from which a circuit oil line 115, typically on the order of 1¼ inch or larger pipe and conducting 20 to 40 gallons per minute, is connected to a fitting to a pipe leading to the nozzles 36. A choke CB may also be used to maintain pressure in the oil header 117 during normal operation. Large diameter pipes are used for the high flow conduits to reduce the velocity in order to reduce the heating of the oil that occurs when high velocity, turbulent oil passes through small diameter pipes. A circuit cooling oil conduit 95, relatively small in diameter as compared with the circuit oil line 115, is tapped into the oil header 117, and bypasses the diverter valve 89. The circuit cooling oil conduit 95 provides cooling oil to remove the heat generated by windage, when the impeller and runner are evacuated of a normal flow of circuit oil. To this end, a choke in the form of a small orifice 98 may be provided in the circuit cooling oil conduit 95 to limit the flow for bypass circuit operation.

Also, from the diverter valve 89 a bypass oil line 94 extends that opens into the reservoir 75. The by-pass oil line 94 may also have a choke in the form of an orifice 99 between the diverter valve and the reservoir, to provide back pressure to the oil header 117. Lube oil line 96 from the oil header 117 provides lube oil to the bearings 60 and 55. Lube oil line 96 is relatively small compared to circuit oil line 115, and a choke CA may be used to control the bearing lube oil flow, typically on the order of 1 to 2 gallons per minute. In certain applications, for example, when there is a wide operating speed range of the diesel engine and the pump speed is directly controlled by fluid coupling input speed, a back pressure regulating valve may be preferred to maintain a relatively uniform oil supply pressure for the bearings, and chokes 99 and CB not used. In other applications, the diesel engine operating speed and ambient temperature conditions may be quite uniform and a back pressure regulating valve may not be needed.

The function of the temperature control valve ZZ is to mix the cooled oil from the heat exchanger and the uncooled oil that bypasses the heat exchanger in proper portions to provide a supply of oil to the fluid coupling at the specified temperature set point. In certain applications, it may desirable for all of the oil to be cooled all of the time, and a temperature control valve is not required.

The temperature sensor 91 extends through a wall of the housing 14, and into the trough 92 through which oil being discharged from the impeller passes. The temperature sensor 91 is electrically connected to operate the electrical operator 90 of the diverter valve 89.

A control panel EE contains instruments such as oil header temperature gage, oil header pressure gage, circuit oil discharge temperature gage and circuit oil discharge over-temperature switch which functionally causes the oil diverter valve 89 to operate when an over-temperature event occurs. FW Murphy Company of Oklahoma manufacturers a combined temperature gage and over-temperature switch in one instrument, and this uses a remote sensor operating on the Bourdon tube principle, with the sensor located in port 91 and the instrument located in the control panel EE. Another type of over-temperature detection device, known as a Kaiser switch, is a combined switch and sensor, and it is directly located in port 91 with a wire leading to it from the control panel. Another type of over-temperature device, also made by FW Murphy, is an instrument that displays temperature, contains over-temperature switch function and is driven by a thermocouple remotely mounted in port 91.

The Bourdon tube gage and switch device and the Kaiser switch device are common on much power transmission equipment including fluid couplings. However, over-temperature events, depending upon the temperature reached, can cause a Bourdon tube device to expand inelastically and develop an offset. While the Kaiser switch is a unitized instrument and has the appeal of simplicity, the switching part of the instrument is not capable of withstanding repeated extreme over-temperature events either.

Because the fluid couplings that are the subject of this application are made entirely of steel or ductile iron, they can handle over-temperature events that are beyond the capability of those made using aluminum components, and therefore, there is a need for over-temperature sensing and switching devices that are capable of surviving repeatedly over-temperature events with very high temperatures, on the order of 400 to 450 degrees Fahrenheit. A display and switching instrument driven by a thermocouple mounted in the port 91 is not affected by such over-temperature events because such systems can easily handle events over 1000 degrees Fahrenheit, or higher, depending upon the materials used to make the thermocouple, far higher than is expected to be experienced in a severe over-temperature event by any fluid coupling. This type of thermocouple driven temperature sensing, display and switching instrument is commonly found in fluid drives throughout the power generation industry, but heretofore, it has not been used in fluid couplings in the mobile equipment industry.

In the case of a massive jam, the oil in the fluid coupling will become overheated with respect to the set point of the temperature sensor and the entire coupling will be evacuated, preferably in no more than 15 seconds, by virtue of the operation of the diverter valve 89 and the passages 39 and orifice plugs 41. The filling rate on start-up is preferably about 45 seconds.

Figure 9:
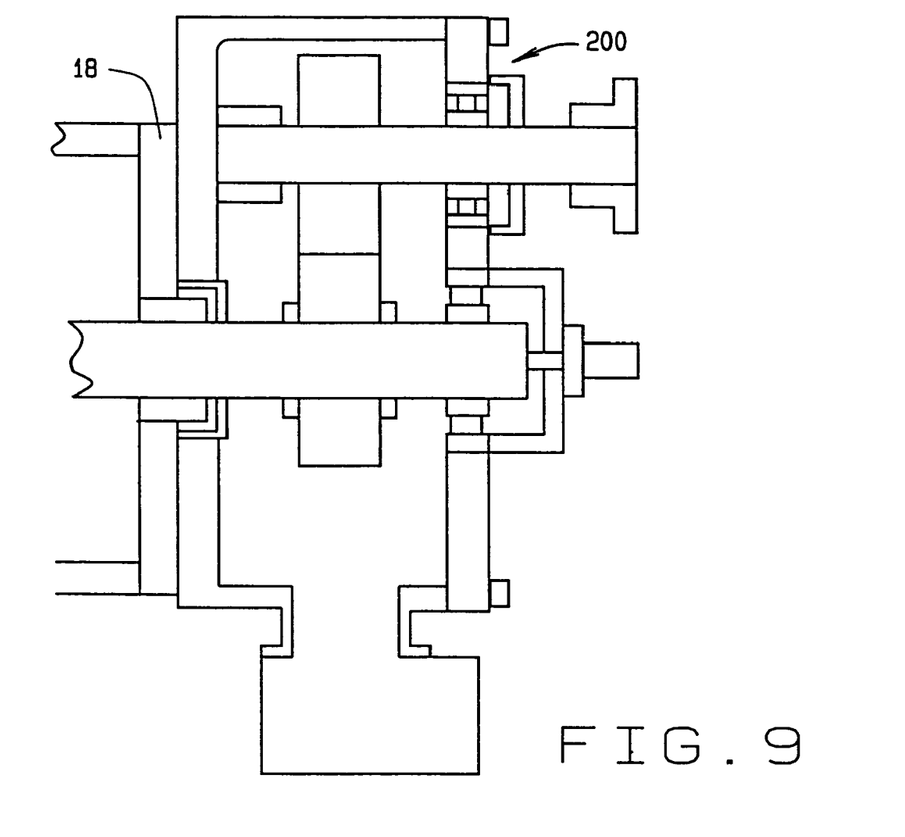
FIG. 9 is a somewhat schematic view in section of a gear box connected to an end plate of a module of this invention.
Figure 10:
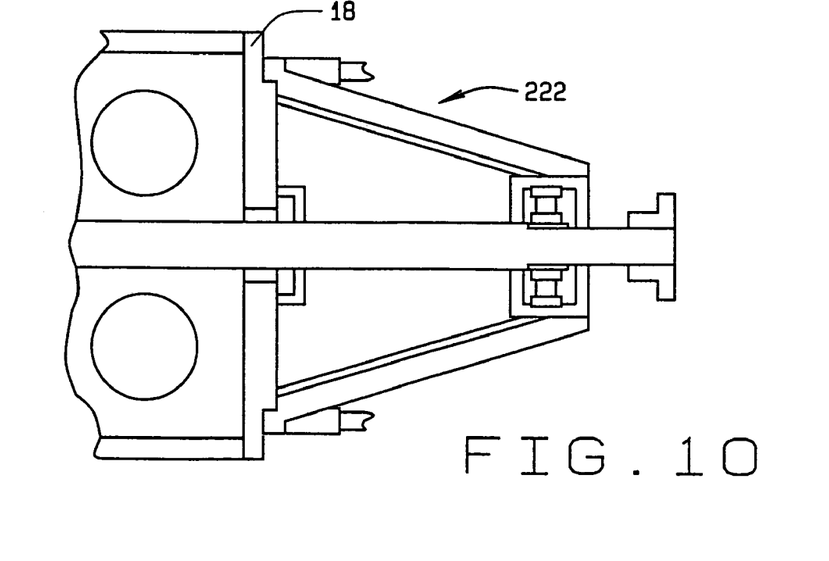
FIG. 10 is a somewhat schematic view in section of a direct drive connected to an end plate of a module of this invention.

In the illustrative embodiment shown, the center housing plate 18 is bolted to the external housing 14 by bolts 23, and a clamshell housing 100 is bolted to the center housing plate 18 by bolts 104, threaded into the bosses 19 of the plate 18. The clamshell housing 100 houses a sheave or multiple sheaves 105, mounted on the output shaft 50. The shaft 50 projects through the clamshell housing 100 and is journaled in a roller bearing 102, carried by an end plate 101, which can be either integral with the clamshell housing 100 or separate and bolted to the clamshell housing. The side wall of the clam-shell housing 100 is open through a substantial arc, to admit belts 108 extending around the sheave 105, and leading to a sheave on the hammer mill 12. Because the boss pattern of the bosses, hence the bolt pattern of the corresponding bolts of the clam-shell housing, is circular and of uniform angular spacing, the clam-shell housing can be oriented in any desired angular direction permitted by the bolt spacing, to permit the belts to extend vertically, horizontally, or somewhere in between, as the position of the hammer mill relative to the fluid coupling requires. As has been indicated, the bosses 19 are designed to permit the bolting to the plate 18, hence to the fluid coupling module, of a wide variety of power transmission elements. Some different kinds of power transmission elements will require different output shaft configurations, but the appropriate output shaft will be supplied in most cases by the manufacturer of the fluid coupling, so that the recipient of the module has only to bolt on the power transmission element. In the case of complex coupling systems such as a gearbox, the output shaft can have a configuration to attach a gear shaft, or alternatively, the gear manufacturer can provide a gear shaft to the fluid coupling manufacturer for assembly. A gear box 200, shown somewhat schematically in FIG. 9, and a direct drive 222, also shown somewhat schematically in FIG. 10, are merely illustrative of drive trains that can be accommodated by the module of this invention.

Figure 8:
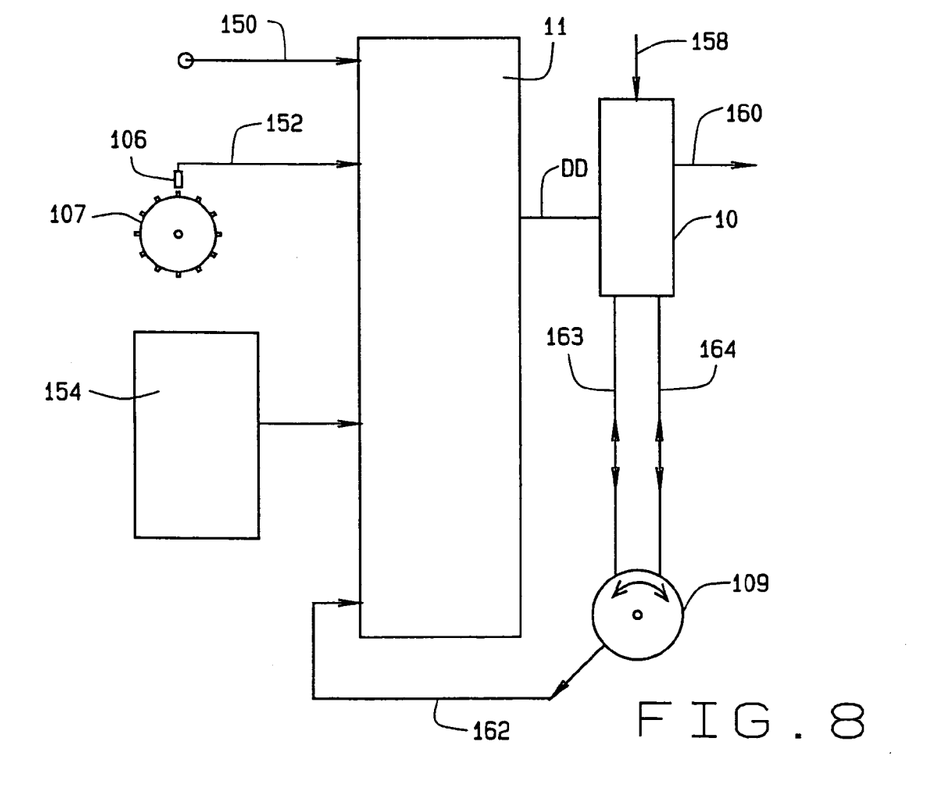
FIG. 8 is a schematic view of an electrical/hydraulic control circuit for regulating the speed of a feed conveyor.

Referring now to FIGS. 1, 7 and 8, between the outer end of the sheave 105 and the end plate 101, a multi-toothed wheel 107 is mounted on the output shaft, which mates with a speed pickup 106 that provides output shaft speed information, through wire 152 to the control 11 that controls the speed of the conveyor 9. The conveyor 9 is driven by a hydraulic motor 109, supplied with hydraulic fluid under pressure by a pump 110 driven by the diesel engine 3. The speed of the hydraulic motor 109 is controlled by the flow rate of hydraulic fluid supplied to it, which in turn, is dependent on the control of a control valve 10 that is regulated by a computer 11 that is programmed to be responsive to, among other things, the output shaft speed pickup signal from sensor 106, as is well known to those skilled in the art. A schematic of a suitable control system is shown in FIG. 8. Alternatively, the hydraulic pump can be driven by an electric motor, the speed of which can be regulated functionally by the computer 11, or the conveyor itself can be driven by a variable speed electric motor, through a gear box of some sort, with the variable speed electric motor regulated functionally by computer 11.

In FIG. 8, the hydraulic control valve (control 10) is shown as being controlled by a PID programmable computer (control 11) using communication channel DD. An electric signal indicating actual engine speed is transmitted to the computer 11 through a line 150; and an output speed signal from the fluid coupling output shaft is transmitted through a line 152, by which signals the differential slip speed is determined by the computer 11. Various fixed input data, indicated by the box 154, are stored in the computer, such as a slip speed set point, a minimum output shaft speed (which determines if the direction of the conveyor is to be changed, or the system shut down), and depending upon these various criteria and the programming, an output signal from the computer is transmitted to the control valve 10, to which a high pressure hydraulic fluid line 158 from the pump 110 is connected and from which a return line 160 extends to a reservoir RR which supplies hydraulic fluid to the pump 110. Hydraulic oil lines 163 and 164 function to deliver oil and to return oil to and from the motor 109 and valve 10, depending upon the direction of rotation of the motor 109. A feedback signal indicating the actual conveyor speed, forward and backward, is transmitted from a sensor on the hydraulic motor 109 to the computer 11 through a line 162.

Programs used in controller 11 may have many features, selectable by data entry during operation, depending upon the objectives of the programmer and, for example, the types of sensors used, the numbers of sensors used, the types and capabilities of the conveyor, the abilities to open and to close the opening, or mouth, of the mill, the design of the hammers, whether fixed or swinging, the feedstock, and the desired chip size.

A very simple program could have, for example, three discreet forward speeds, one reverse speed, and stop for the conveyor, controlled only by the fluid coupling output speed, such that when the output speed is above a preset set point, the conveyor goes at the fastest speed, when the fluid coupling output speed is at the set point speed or in a very narrow range around the set point speed, the middle conveyor speed is used, when the output speed is below the set point speed, the slowest conveyor speed is used, and when the conveyor speed is below a second set point speed, the conveyor goes into reverse, and when the fluid coupling output speed is below the second set point for more than a specified period of time, the controller functionally sends a signal to the diverter valve, and the oil flow is diverted and the fluid coupling stops transmitting torque, the conveyor stops, the engine is shut down in an orderly manner, and the mill is cleared.

Alternately, the program can be written so that the computer calculates slip speed from the engine speed via input speed signal 150 and from the fluid coupling output speed via signal 152, and provides discreet speed control for the conveyor speed based upon slip speed and slip speed set point such that when the slip speed is near zero, the fastest conveyor speed is used, when the slip speed is at or very near the set point slip speed, the normal conveyor speed is used, when the slip speed is greater than the slip speed, the slowest conveyor speed is used, when the slip speed exceeds a second set point speed, the conveyor reverses, when the slip speed exceeds the second set point slip speed for a period greater than a specified time period, the controller functionally sends a signal to the diverter valve and the circuit oil flow is diverted, the fluid coupling stops transmitting torque, the conveyor stops, the engine is shut down in an orderly manner, and the mill is cleared.

As another alternative, the computer program can be written to calculate the slip speed percentage, being the slip speed divided by the input speed and expressed as a percentage, with the same control over the conveyor being provided as a function of slip speed percentage rather than slip speed. By using a percentage of the slip speed as the criterion, the operation of the control is largely independent of the engine speed which could be set anywhere in the range of 1800 to 2300 rpm, depending largely on engine nominal speed range.

Alternately, the program can be written to provide variable speed control of the conveyor according to output shaft speed, slip speed, or slip speed percentage, though the preferred parameter is slip speed percentage, such that, for example, the conveyor speed is inversely proportional to the slip speed wherein when the slip speed percentage is zero, or almost zero, the conveyor is at the fastest conveyor speed; when the slip speed percentage is at the preset set point, the conveyor speed is at the normal conveyor speed, and when the slip speed percentage varies above or below the set point percentage, the conveyor speed decreases or increases smoothly and linearly in an inverse proportionality to the slip speed percentage. When the fluid coupling slip speed percentage increases above another preset setpoint, then the conveyor goes into reverse and when the slip speed percentage decreases below the second setpoint, the conveyor resumes forward motion at a speed determined by the current fluid coupling slip speed. Should the slip speed percentage remain above the second setpoint for a period exceeding a specified time period, then the control 11 functionally causes the diverter valve to divert oil from the fluid coupling, the fluid coupling terminates transmitting torque, the conveyor stops, the engine is stopped is a normal manner, and the mill is cleared.

Additionally, other functions of the feedstock feeding apparatus, such as mill mouth opening, can be controlled in similar ways to the above descriptions for control of conveyor speed.

Figure 11:
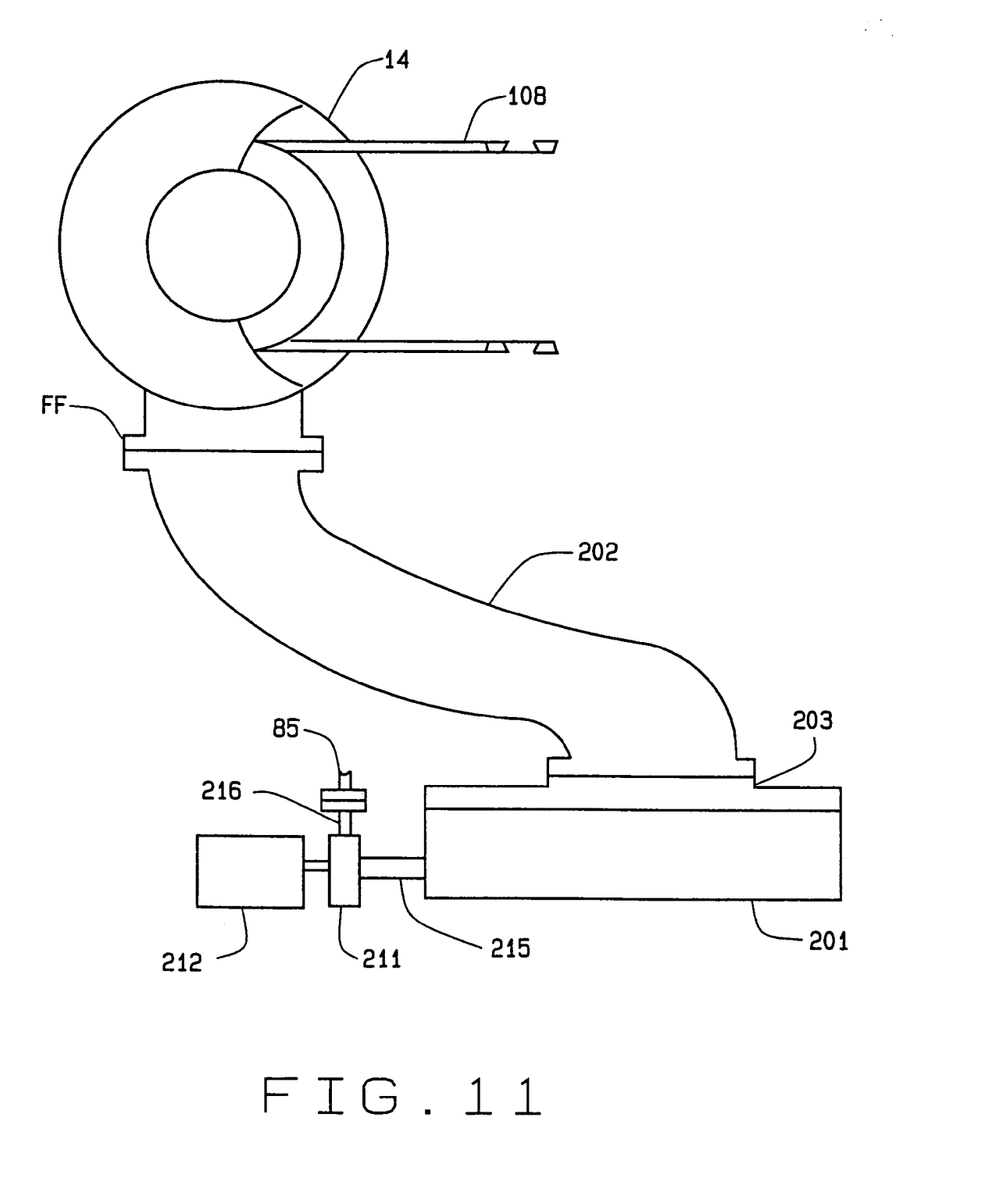
FIG. 11 is a somewhat schematic end view of a fluid coupling with a remote oil reservoir of this invention.

Referring now to FIG. 11, an oil reservoir 201 is shown remotely mounted from fluid coupling housing 14, and connected to the fluid coupling by a conduit 202. Conduit 202, which may be flexible or rigid to suit the arrangement, is fixed at one end to flange FF and fixed at the other end to flange 203 of the oil reservoir, and is sized to suit the flow, elevation difference and distance between the fluid coupling and reservoir. The reservoir may be shaped to suit the space available, and may be sized to contain more oil than would be possible if the reservoir were attached to the fluid drive mounting flange FF. In this arrangement, the oil pump 211 is driven by a motor 212, either electric or hydraulic, oil is supplied to said pump via a suction line 215 and oil is discharged by line 216 that connects to line 85 of the oil system 84 described above and shown in FIG. 5. In this embodiment also, the inlet to the pump is below the level of oil in the reservoir, thereby making it a self-priming pump, which is preferred, though pumps mounted above the oil level of the reservoir do function so long as a prime is achieved or retained.

Figure 6:
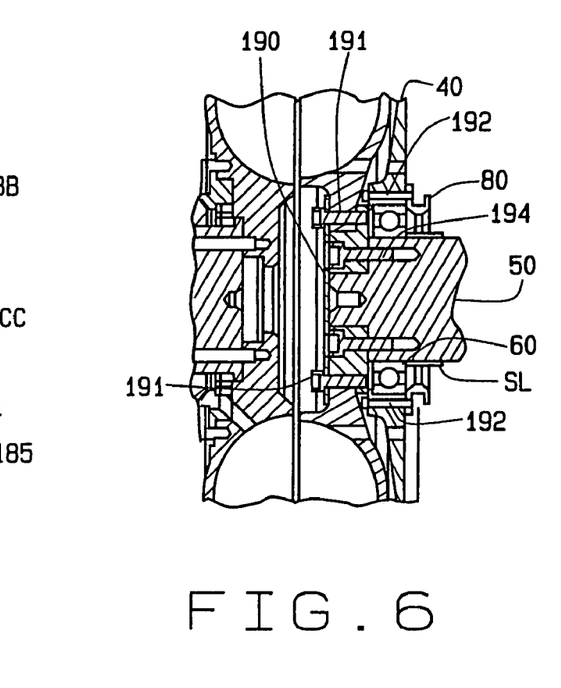
FIG. 6 is a fragmentary view in cross section of a second embodiment of a coupling assembly between a runner and an output shaft.

There are occasions when it is desirable to disassemble the rotating element of the fluid coupling completely. Referring to FIG. 6 for an improved design that makes such disassembly possible so that all parts are reusable, as compared with the arrangement shown in FIG. 1, a removable hub 190 is provided between the runner and output shaft 50, bolted to the runner by bolts 191, with dowel pins not here shown interspersed between bolts 191, and bolted to the output shaft 50 by bolts 194, with dowel pins not here shown interspersed between bolts 194, and the direction of bolts 192 that attach the driving sprocket 80 to the impeller casing 40 is reversed as compared with the bolts shown in FIG. 1 as securing the driving sprocket to the impeller casing. The bolts 192 are threaded into tapped holes in the driving sprocket 80. These changes permit removal of the impeller casing, sprocket, and ball bearing 60 without removal first of the bearing 55 from the output shaft, which requires great heat to accomplish. Bearing 55 is installed on the output shaft with a significant interference fit, which can be accomplished by heating slowly, as in an oven or by an induction heater. However, to get this bearing and center plate off the shaft, in the design shown in FIG. 1, requires considerable heat applied quickly to the bearing 55 and because this bearing can be heated from only the output end, the bearing is almost certain to be overheated and of no more usefulness. With the use of the runner hub 190, the runner and runner hub can be removed easily, and with the reversal of the direction of bolts 192, the impeller casing 40 can be removed from bearing 60 with heat without damage, then bearing 60 can be heated relatively quickly and without overheating, and removed without damage, the sprocket 80 and sleeve SL can be removed easily, the center plate 18 can be heated and removed easily, leaving bearing 55 exposed. The bearing 55 can then be heated from its outside diameter and both sides simultaneously, relatively quickly but without overheating, to permit its removal without damage.

Numerous variations in the construction and operation of the apparatus of this invention, within the scope of the appended claims will occur to those skilled in the art in the light of the foregoing disclosure. Merely by way of example, although the module of this invention has particular utility in use with a diesel engine, other prime movers can be employed. As has been indicated, the fluid coupling can be used to drive apparatus different from a hammer mill. The internal piping of the module can be changed to suit the needs of the device, and the dimensions of such elements as the orifices in the lines and the passages through the impeller casing, runner and casings can be varied, again, to meet the requirements of the particular machine or task, as for example, to increase or decrease the fill time and the emptying time of circuit oil, or the temperature limits of the circuit oil temperature sensor. The runner hub can be made integral with the runner. The radial passages 39 can be made in the impeller rather than in the impeller casing, although the arrangement described is preferred, for the reasons given. The circulating oil pump in the reservoir can be driven by a gear train from a gear on the input shaft, or the pump can be removed from the reservoir and mounted externally and driven by an electric motor directly or by the diesel engine directly, In any case, the intake to the pump should be below the level of oil in the reservoir, to make the pump self priming. The same diesel engine that powers the fluid coupling can be employed to run a generator to provide electricity to power the oil pump motor or the conveyor motor, or both, as has been indicated as alternatives to the chain or gear drive, or hydraulic motor drive to the pump motor, or the hydraulic motor to power the conveyor. These variations are merely illustrative.

The invention claimed is:

1. In an assembly including a fluid coupling, a prime mover for driving said fluid coupling, a rotating comminuting machine, a power train between said fluid coupling and said rotating comminuting machine, and a conveyor for feeding material to said comminuting machine, said fluid coupling having an impeller and a runner, said runner being fastened to an output shaft, said conveyor being driven at a substantially constant speed, the improvement comprising means mounted on said output shaft responsive to a change in speed of rotation of said output shaft, and means responsive to a predetermined amount of slow-down of said output shaft for reversing the direction of said conveyor for a predetermined length of time and restoring the original direction after said length of time.

* * * * *